(No Model.)
S. PETTIT & W. LOTTRIDGE.
HORSE HAY RAKE.
No. 411,607. Patented Sept. 24, 1889.
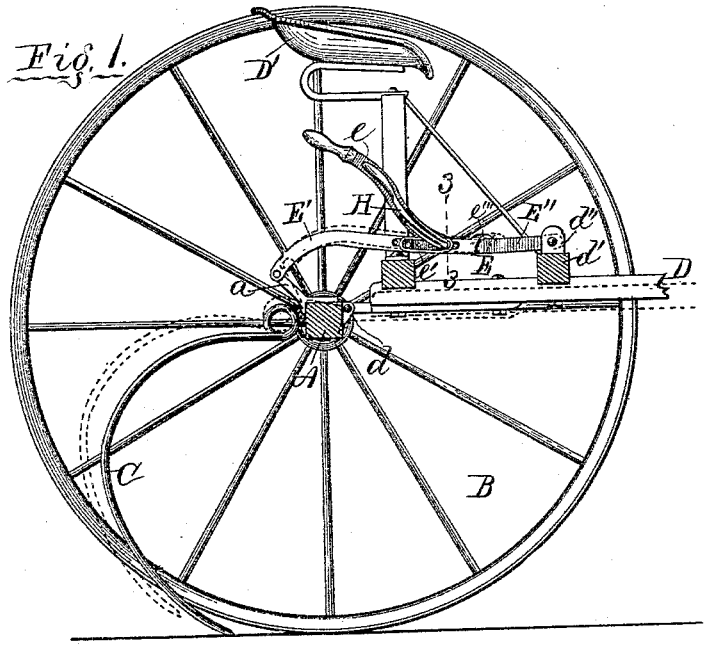
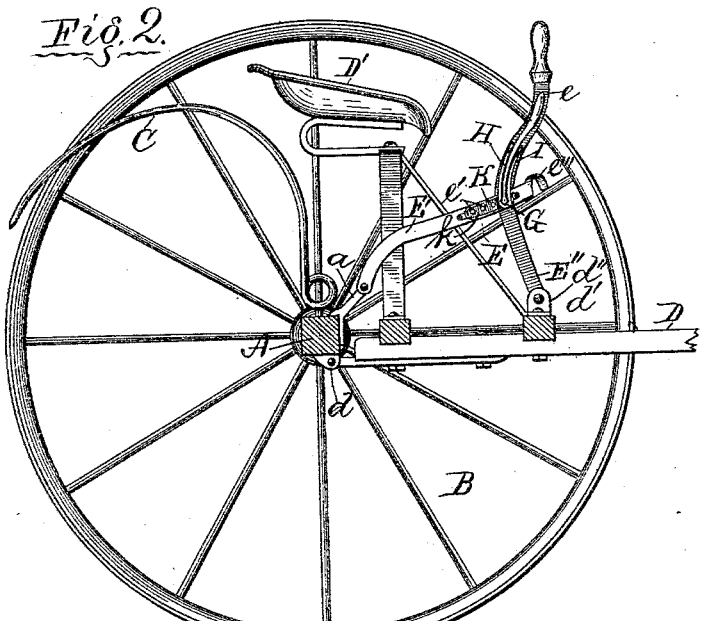
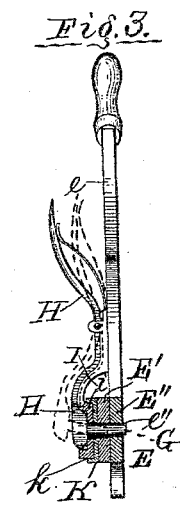
Witnesses:
P. R. Richards
Chas Conley
Inventors:
Samuel Pettit and
William Lottridge,
By W. B. Richards
Atty.

UNITED STATES PATENT OFFICE.

SAMUEL PETTIT AND WILLIAM LOTTRIDGE, OF GRINNELL, IOWA, ASSIGNORS TO CRAVER, STEELE & AUSTIN, OF SAME PLACE.

HORSE HAY-RAKE.

SPECIFICATION forming part of Letters Patent No. 411,607, dated September 24, 1889.

Application filed July 5, 1889. Serial No. 316,537. (No model.)

*To all whom it may concern:*

Be it known that we, SAMUEL PETTIT and WILLIAM LOTTRIDGE, citizens of the United States, residing at Grinnell, in the county of Poweshiek and State of Iowa, have invented certain new and useful Improvements in Horse Hay-Rakes, of which the following is a specification.

Our invention relates to that class of horse hay-rakes in which a series of curved teeth depend either from a rocking axle, which is supported upon wheels and constitutes the rake-head, or in which such teeth depend from a rocking bar or rake-head, which is hinged to the axle or rake-frame, and in both of which type of rake the teeth trail upon or near to the surface of the ground and gather the hay which collects in the bends of the teeth, and in which the collected load of hay is discharged by swinging the teeth upwardly by a partial rotation on its axis of the rake-head to which said teeth are fixed, which partial rotation is given said rake-head by means of toggle-jointed levers; and our invention consists in the use of an adjustable joint or connection between the two toggle bars or levers, by means of which adjustable joint the toggle may be adjusted and fixed in its length to adjust and fix the height at which the points of the teeth will be carried when the rake is in operation.

Our invention further consists in improvements in construction and certain combinations by means of which the device may be more effectively operated, especially while the rake is in operation in the field, all as hereinafter fully described.

In the accompanying drawings, which illustrate our invention as applied to a horse hay-rake of that type in which the rake-teeth are fixed to a rocking axle, Figure 1 is a sectional elevation showing the rake-teeth in position for gathering hay. Fig. 2 is a sectional elevation in same plane as Fig. 1, but showing the rake-teeth in their elevated positions for local transportation. Fig. 3 is a sectional elevation of the toggle in the line 3 3 in Fig. 1, and of the handle for operating them, and an elevation of the journal-bolt which forms the joint or pivotal connection between the bars or levers of the toggle and the thumb-lever which actuates said bolt. Fig. 4 is a top plan of the toggle, the handle which operates it, and other adjacent parts.

In order that our invention may be more fully and clearly defined and understood, we will first briefly describe the general machine in which we have shown it as embodied.

The axle A is supported by wheels B and carries a series or rank of curved spring-wire rake-teeth C, which are fixed to the axle, as shown, or in any ordinary manner. Draft-bars D are hinged at $d$ to the axle and support a driver's seat D' and a transverse bar $d'$. The axle A is rotated or rocked to raise and lower the rake-teeth by means of a toggle E, which is formed of bars or levers E' E'', one of which E'' is hinged to a standard $d''$, which is fixed to the bar $d'$ and the other E' is hinged to an arm or standard $a$, which is fixed to the axle. The toggle-lever E'' is extended to form a handle $e$, by means of which the toggle may be operated by the driver in his seat D' to lower the rake-teeth for raking and collecting the hay, and to raise them for discharging the hay and for other purposes, in the manner common to this class of rakes. As heretofore constructed, there has been a pivotal connection or hinge between the two members E' E'' of the toggle, but it was not of such nature that it could be adjusted and fixed after adjustment to both shorten and lengthen the combined length of the toggle-arms and thereby furnish means for fixing the points of the rake-teeth at different heights above the ground in raking, as is required in different kinds of hay and on different kinds of soil in order to do the most effective work. This toggle, as heretofore constructed, has also had a hook $e'''$ on one end of the bar E', which hook rests upon the bar E'' when the rake-teeth are lowered to work. This hook may also be as shown, or may be longer, if preferred, so as to permit the pivot-point G to lower to a plane below the pivots of the toggle-levers E' E'' to the standards $a$ $d''$, respectively, and thereby form the ordinary lock which prevents the rake-teeth rising until operated by the handle $e$.

As a means for shortening and for lengthening, one or both of its bars or members E' E''' may have a series of perforations $e'$. We have shown these perforations in the drawings herewith in the bar E'. The bars E' E" can be adjusted to bring either hole $e'$ coincident with a hole $e''$ in the bar E", and are held after such adjustment by a pin or bolt G, which passes through said coincident holes.

As a means for effecting the adjustment of the length of the toggle while the rake is in operation, the pivot-bolt G is fixed to and carried on one end of a spring-actuated thumb-lever H, which is pivoted or hinged to a small bracket I, that is fixed at one of its ends to the handle $e$, while its other end has a perforated stud or projection $i$, which can slide, when the bars E' E" are not locked by the bolt G, in a longitudinal groove $k$ in a plate K, which is fixed to the bar E'. The bolt G passes through a hole in the end of the bracket I and through the stud $i$.

As the nature of the surface of the ground varies and the quality and condition of the hay also varies not only in different meadows, but often in the same passage of the rake across the meadow, it is desirable that the driver in his seat D' be able to effect the adjustment of the toggle-levers without stopping the machine, and this he can do by pressing on the handle of the thumb-lever H to release the bolt G, when he can, by means of the handle $e$, easily effect any adjustment of said levers desired, as the stud $i$ will slide in the groove $k$ and thus hold the bolt G in line with the holes $e'$. The adjustment of the rake-teeth for raking close to the surface of the ground is shown by full lines at Fig. 1, and for raking at one higher plane is shown by dotted lines at same figure.

Having thus described our invention, what we claim as new, and desire to secure by Letters Patent, is—

1. In a horse hay-rake, in combination with the frame or draft-bars, oscillating teeth-carrying head and toggle-levers, one of which is pivoted to the frame or draft-bars and the other to the oscillating teeth-carrying head, and one of which is perforated with a series of holes $e'$, a pivot-bolt for pivotally connecting the two members of the toggle-lever, which pivot-bolt is carried upon a thumb-lever, by means of which it may be released from and engaged with said toggle-lever bars, substantially as described.

2. In a horse hay-rake, in combination, a frame or draft-bars, oscillating teeth-carrying head and toggle, one member of which is perforated with a series of holes $e'$ and provided with a perforated plate K, having a guide-groove $k$, and the other member of which carries a spring-actuated thumb-lever with an attached pivot-bolt G, and a bracket $i$, with a guide-lug $i'$, substantially as described.

3. In a horse hay-rake, in combination with the rake-teeth, swinging toggle-levers, the pivot-bolt G, fixed to a spring-actuated thumb-lever H, substantially as described, and for the purpose specified.

In testimony whereof we affix our signatures in presence of two witnesses.

SAMUEL PETTIT.
WILLIAM LOTTRIDGE.

Witnesses to signature of Pettit:
S. P. BOYNTON,
ROBERT F. STOCKTON.
Witnesses to signature of Lottridge:
C. B. GRUWELL,
A. H. CRAVER.